United States Patent [19]
Annoni et al.

[11] Patent Number: 5,650,186
[45] Date of Patent: Jul. 22, 1997

[54] HOT BEVERAGE BREWING AND DISPENSING APPARATUS AND METHOD

[76] Inventors: Faust Annoni, 15621 Larch Way N., Lynnwood, Wash. 98037; Stefano Sandei, Via De Ambris, 31A, 43100 Parma, Italy; Ugo Sandei, Via De Ambris, 31A, 43100 Parma, Italy; Pietro Sandei, Via De Ambris, 31A, 43100 Parma, Italy

[21] Appl. No.: 615,752

[22] Filed: Mar. 13, 1996

Related U.S. Application Data

[63] Continuation of Ser. No. 452,810, May 30, 1995, abandoned, which is a continuation of Ser. No. 249,088, May 25, 1994, abandoned, which is a continuation of Ser. No. 72,930, Jun. 7, 1993, abandoned.

[51] Int. Cl.$^6$ .............................. A47J 31/34; A47J 31/40; A47J 31/42; A23F 3/00
[52] U.S. Cl. .................... 426/231; 99/280; 99/286; 99/289 R; 99/287; 426/433; 426/594; 222/129.4
[58] Field of Search ................. 99/279, 280, 281, 99/282, 283, 285, 286, 287, 289 R, 294, 295; 426/231, 433, 594; 222/129.3, 129.4

[56] References Cited

U.S. PATENT DOCUMENTS

| | | | |
|---|---|---|---|
| D. 332,199 | 1/1993 | Pomeroy | D7/309 |
| 3,266,410 | 8/1966 | Novi et al. | 99/287 |
| 4,102,255 | 7/1978 | Gasparrini | 99/303 |
| 4,597,506 | 7/1986 | Eglise et al. | 221/6 |
| 4,796,521 | 1/1989 | Gross | 99/287 |
| 4,797,296 | 1/1989 | Meier | 99/289 R |
| 4,885,986 | 12/1989 | Gross | 99/289 |
| 4,934,258 | 6/1990 | Versini | 99/289 R |
| 4,975,296 | 12/1990 | Newman | 426/433 |
| 5,103,716 | 4/1992 | Mikkelsen | 99/289 |
| 5,158,793 | 10/1992 | Helbling | 426/231 |

FOREIGN PATENT DOCUMENTS

| | | |
|---|---|---|
| 33657A | 11/1969 | Italy . |
| 46027A | 10/1975 | Italy . |
| 46851A | 8/1984 | Italy . |

*Primary Examiner*—Robert W. Jenkins
*Attorney, Agent, or Firm*—Dowrey & Associates

[57] ABSTRACT

A hot beverage brewing and dispensing machine with the ability to dispense first and second successive single shots of espresso coffee with the dispensing of a second separate liquid additive such as foamed milk and/or hot water spanning the time lag between the end of the dispensing flow of the first shot of espresso and the beginning of the dispensing flow of the second shot in order to maintain a continuous dispensing flow.

17 Claims, 6 Drawing Sheets

HOT BEVERAGE BREWING AND DISPENSING APPARATUS AND METHOD

This application is a continuation of Ser. No. 08/452,810, now abandoned, filed May 30, 1995 which is a continuation of Ser. No. 08/249,088, now abandoned filed Mar. 25, 1994, which in turn is a continuation of Ser. No. 08/072,930 filed Jun. 7, 1993, now abandoned.

BACKGROUND OF THE INVENTION

1. Field of the Invention

The present invention relates to improvements in apparatus for brewing hot beverages in brewing machines including coin operated and other vending machines and the like as well as a method of operating such apparatus in a manner which increases the utility and versatility of the machine. The process and apparatus are intended for use in brewing and dispensing espresso coffee.

2. Description of the Prior Art

Coin operated vending machines for dispensing a wide variety of beverages, including hot beverages which are mixed on an individual basis, are well known in the art. With the advent of sophisticated electronics and microprocessors in particular, such vending machines are capable of quite complex functions such as making selections from an array of available beverages, selecting separate ingredients and the amounts of each to be dispensed, e.g. cream, sugar and other flavorings. Additionally, the various functions of the machine in matching deposited monetary amounts with multiple selections made and performing certain diagnostic tests for machine malfunction and/or status are well understood. An example of such electronic controls for coin operated beverage machines may be found in U.S. Pat. No. 4,597,506 to David Eglise et al. Various improvements in brewing apparatus for compacting and charging the compacted ground coffee with hot water under pressure are also available in the art, see U.S. Pat. No. 5,103,716 to Per W. Mikkelsen as an example.

The present apparatus and method deals with improvements in existing coin operated vending machines of the type manufactured and marketed by Ducale Macchine da Caffè—di Sandei Ugo & C.s.n.c., Parma, Italy. The brewing unit is of the general type disclosed in Italian Patent No. 46851A/84 issued to Ducale Macchine da Caffè; Italian Patent No. 33657A/69 issued to Ugo Sandei and Altobano Prampolini; and Italian Patent No. 46027A/75 issued to Ugo Sandei and Altobano Prampolini, respectively. The novel sequence and timing of operational steps in the brewing and dispensing according to the present invention makes possible the completely automatic serving of espresso and double tall or double shot espresso/crema beverages such as latte, cappuccino and the like from a coin operated vending machine in a manner heretofore unknown in the prior art.

SUMMARY OF THE INVENTION

The present invention for the first time provides method and apparatus for preparing double tall or "double shot" espresso/crema beverages in a coin operated, completely automatic apparatus. The delivery or dispensing of the various ingredients takes place in full view of the customer with no lag time between the delivery of multiple ingredients. This is accomplished while maintaining the proper temperature and achieving a high quality in the finished beverage. The sequence of steps includes the release of a cup from a cup tower into a rotatable carousel which moves the cup to a sugar serving or dispensing station and then to a beverage serving station visible to the customer. During the time the carousel is rotating, the exact programmable amount of coffee necessary for the first shot of espresso is being dropped into the brewing chamber. The brewing and dispensing of the first shot of espresso begins and is carried out with water under a programmable pressure and temperature. As this first brewing is being completed, milk and hot water are being delivered and dispensed with optional chocolate and/or other flavors being added. Dispensing of the milk into the beverage container is commenced simultaneously with the end of the first espresso coffee cycle such that actual milk flow starts during the residual coffee flow so as to avoid any dispensing interruption. While the milk and optionals are being dispensed, an exact programmable amount of coffee necessary for the second shot of espresso is dropped into the brewing chamber, the brewing chamber having been cleared of the grounds from the first brewing operation. The serving of the second shot begins without interruption and before completion of the serving flow of milk. The timed sequence of serving the ingredients operates without interruption so as to minimize total serving time without compromising quality. The customer is thus discouraged from removing the beverage container before the dispensing is completed since the flow is continual and visible to the customer. As soon as the beverage is ready, the customer is advised by an audible signal and/or a green light.

DESCRIPTION OF THE PREFERRED EMBODIMENT

Figure 3:
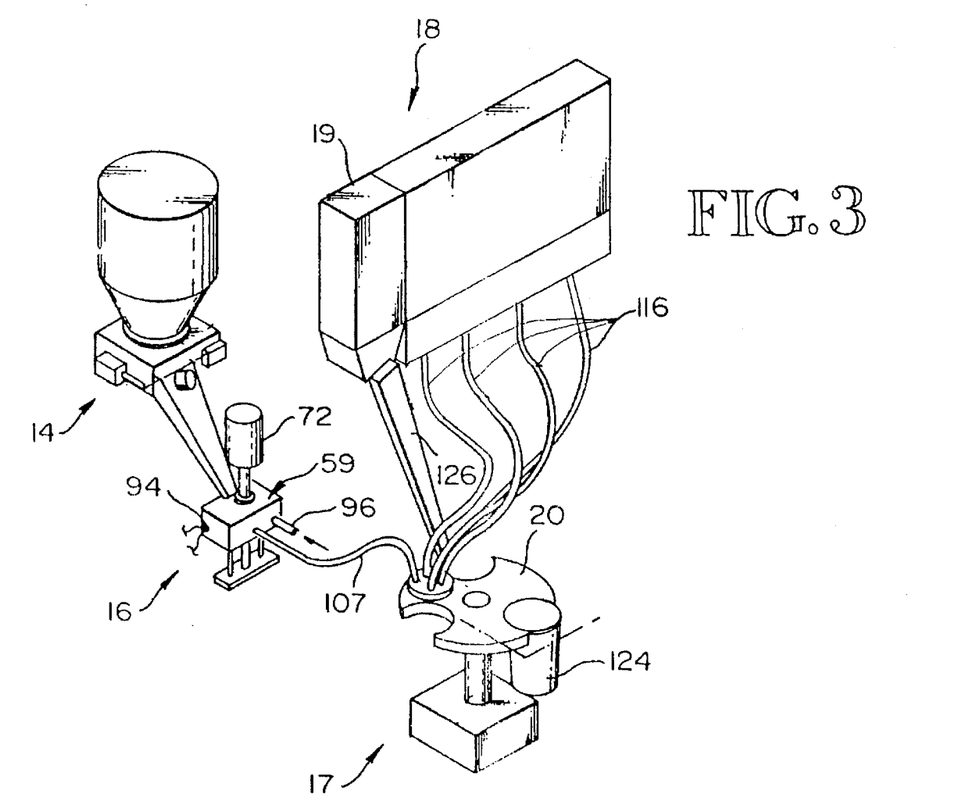
FIG. 3 is a schematic illustration of the overall system.

Referring to FIG. 3, the various components of the apparatus will be understood to be mounted within a vending machine cabinet. The components of the apparatus as disclosed in FIG. 3 include the grinding and dosing unit indicated generally at 14, and the brewing unit 16 located adjacent the beverage serving station 17. A store of mixing ingredients such as sugar, chocolate, milk and other flavorings are stored in the bank of storage containers 18. Although the selection of ingredients may be varied, for the purpose of description of the present embodiment, the bin 19 will be understood to contain sugar and the remaining containers in the bank 18 may contain any variety of flavorings and milk.

As shown in FIG. 3 a cup receiving carousel unit 20 is mounted adjacent the beverage serving station 17, and functions to receive a cup 124 deposited therein by a cup dropping mechanism well known in the art, not shown. The carousel unit is a three position rotary device which receives and transports the serving cup from an initial position to a sugar serving station.

Brewing Unit

Figure 1:
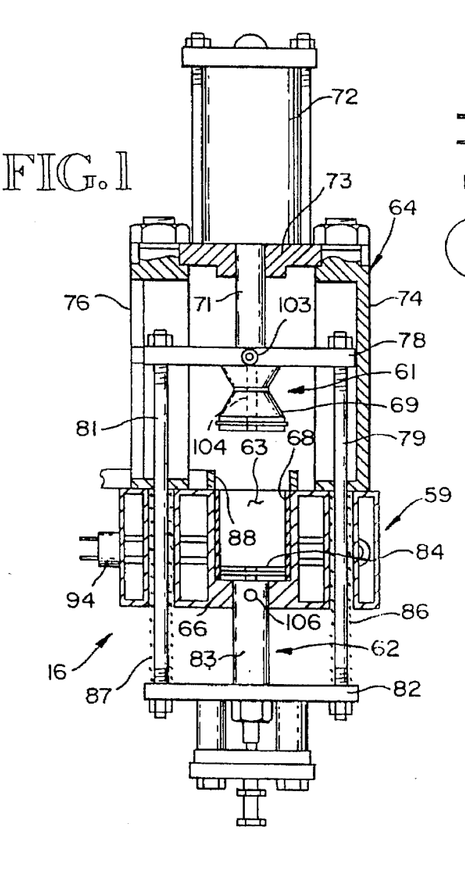
FIG. 1 is a partially sectioned view of the brewing block and brewing cavity.
Figure 2:
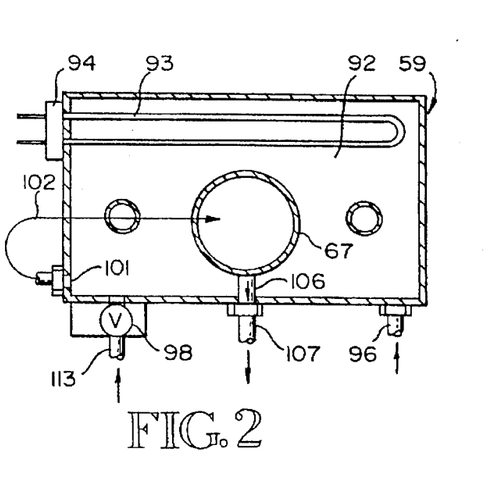
FIG. 2 is a sectional view showing the boiler cavity in the brewing block.

The brewing unit 16 is shown most clearly in FIGS. 1 and 2 and generally includes the brewing chamber block 59, an upper piston assembly 61, a lower piston assembly 62, a brewing chamber 63 and a guide support structure 64 for mounting the upper piston for vertical reciprocation.

The body 66 of the block 59 may be a solid monolithic casting which is mounted by bolts or the lake in a fixed position on the machine frame. The body 66 of the block 59 is provided with a vertical bore which defines the coffee brewing chamber 63. According to the present invention, the brewing chamber block 59 is made of cast bronze and, in addition to functioning as a brewing chamber, constitutes a second boiler for constantly maintaining a sufficient volume of coffee brewing water at the exact temperature in order to handle an increased brewing frequency. A primary water boiler, not shown, is provided which initially supplies hot water to the brewing block boiler. The bore of the brewing chamber 63 is fitted with a thin stainless steel sleeve 68 which vastly improves the function of the cast bronze brewing chamber. The stainless steel sleeve 68 not only provides a more sanitary surface required for food preparation purposes but also strengthens the walls of the comparatively soft cast bronze material to accommodate increased coffee exploitation. With the hard wear-surface provided by the sleeve 68, ther is decreased wear and tear on the surface of the cavity which increases the life of the brewing block and mimimizes maintenance costs.

Referring to FIG. 1, the primary or upper piston 69 is carried on the lower end of the piston rod 71 of a double acting fluid cylinder 72. The fluid cylinder 72 is mounted on the cross bar 73 which extends between the upright post members 74 and 76 and may be provided with a pressure gauge not shown for monitoring the piston pressure. It will be understood that the cylinder 72 is a double acting fluid cylinder capable of raising and lowering the piston member 69 with valve means controlled by the electronic control system of the machine. An upper yoke 78 is connected to the piston member 69 and slidably engages the laterally spaced vertical guide rods 79 and 81 with the guide rods being mounted for reciprocation in suitable bores in the body of brewing block as illustrated in FIG. 1. A second yoke or bottom yoke 82 is rigidly connected to the bottom ends of the guide rods 79 and 81 and provides a mounting for the lower piston rod 83 which carries the lower piston 84 for reciprocation within the stainless steel sleeve 68. It will be understood that the piston rod 83 and guide rods 79 and 81 are fixed to the yoke 82 and reciprocate with the yoke. As illustrated in FIG. 1, the yoke 82 and lower piston 84 are biased to the bottom or lowered position of piston 84 by means of the compression springs 86 and 87 surrounding the guide rods 79 and 81 respectively. The upper yoke 78 is guided for vertical reciprocation within appropriate 8lots in the post members 74 and 76 as illustrated in FIG. 1. It will be understood that the yoke member 78 has a sliding connection with both of the guide rods 79 and 81 whereby further raising of the piston and yoke 78 as seen in FIG. 1 serves to raise the lower piston 84 to expel the coffee grounds from the brewing chamber 63 when the upper piston is in its fully raised position. This compound motion of the upper and lower pistons for compressing the shot of espresso and then expelling the spent grounds is well understood in the prior art.

When the spent and compressed charge of coffee grounds is expelled from the brewing cavity 63 by the lower piston, a sweep arm 88 located on the top surface of the brewing block serves to remove the coffee grounds which drop to a suitable container. The coffee grounds removal mechanism is also a well known apparatus used in the prior art devices.

In the prior art, the brewing water is normally heated to a predetermined temperature in a boiler and then passed under pressure through the ground coffee held under compression by a piston in a brewing chamber. In some instances electrical resistnce heating has also been provided to maintain the brewing chamber at an elevated temperature. The present invention departs from this concept and provides a secondary or additional water boiler chamber 92 in the body of the brewing block as seen in FIG. 2. The boiler chamber 92 is provided with a cal rod 93 which comprises an electrical resistance heating element submersed in the water within the boiler chamber. The cal rod has an electrical fitting 94 mounted on the boiler chamber block as seen in FIG. 2. The brewing water is initially heated in a conventional or primary remote boiler not shown, and pumped into the brewing block boiler 92 via the conduit 96. From the boiler 92, the heated brewing water exits the brewing block via the port 101. A flexible hose 102 carries the heated brewing water to the fitting 103 in the yoke 78 which is fixed to the piston 69. The brewing water passes through the piston head 69 via conduit 104 and, with the piston in the lowered coffee compacting position, passes through the ground coffee in the cavity 63. The brewed coffee is delivered through the conduit 106 which registers with a dispensing tube 107 and into the beverage container as shown in FIG. 3.

As aforementioned, the upper piston 69 is shown at the middle position in FIG. 1. At this point a single premeasured dose of ground coffee is delivered into the brewing chamber 63. As the piston continues on its downward travel, a main pressure pump (not shown) pumps the heated water in the boiler 92 through the piston head and into the compacted ground coffee. Once the predetermined amount of water has been passed through the compacted coffee, the main pressure pump is deenergized. When the piston returns to the extreme raised position, the yoke 78 contacts the stop members on the guide rods 79 and 81 to lift the lower piston 84 upwardly expelling the charge of coffee grounds from the brewing chamber. When the yoke 78 reaches the end of its travel, the sweep arm 88 is energized to remove the coffee grounds from the top surface of the block 59. When the piston 79 returns to the bottom rest position, the system is ready for recycling. The espresso brewing cycle may vary but usually takes from 12–20 seconds to complete.

After a preprogrammed amount of time has elapsed without serving any beverages, flushing water is provided via the flushing water conduit 113 which is connected to the external water system. The valve 98 is opened to direct the flushing water through the conduit 101, the flexible hose 102, the conduit 104 and finally into the brewing chamber 63 with the flushing water exiting through the conduit 107 and into the waste water container.

Control System

Figure 4:
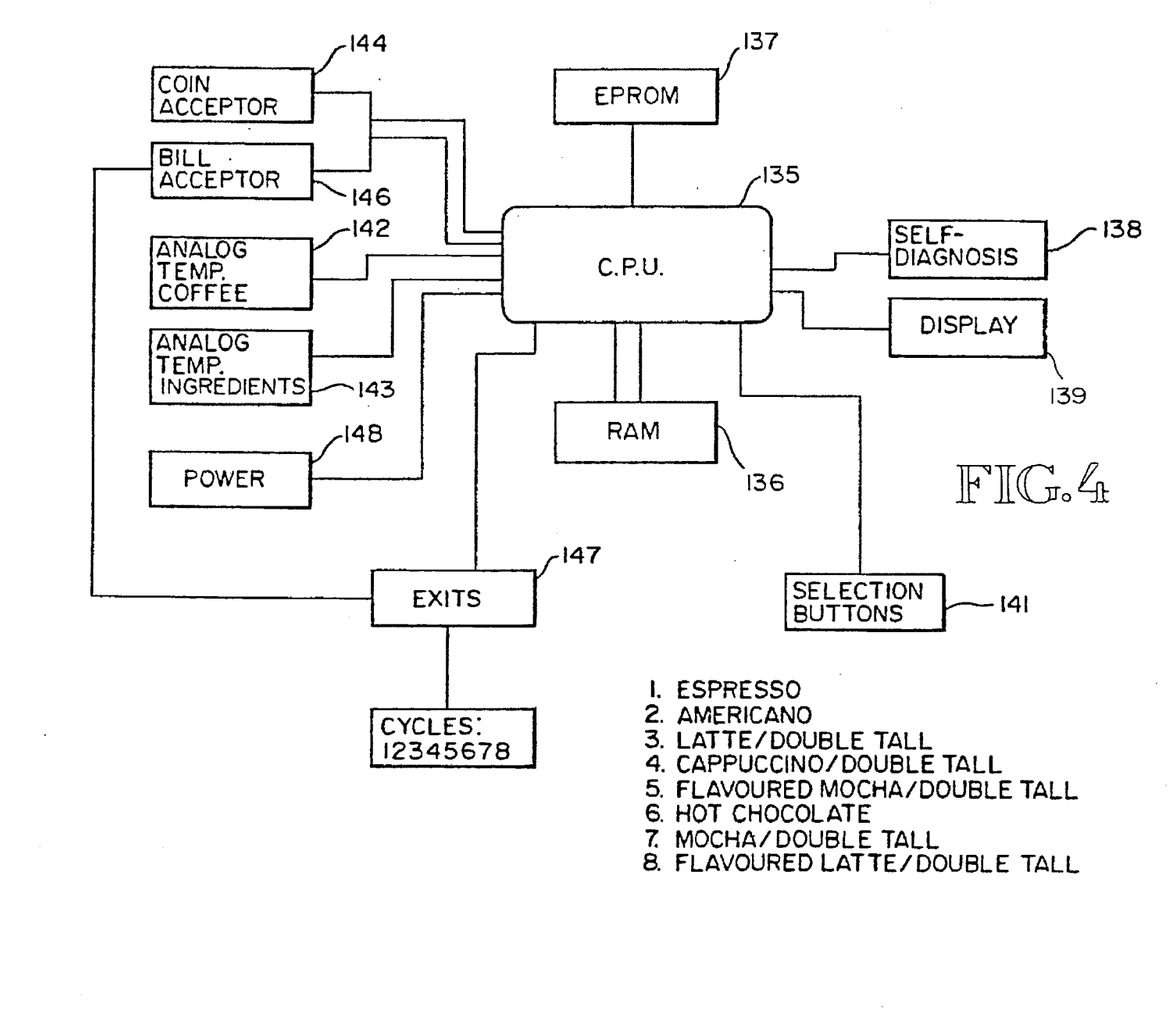
FIG. 4 is a schematic electrical diagram of the circuits employed in the machine.

FIG. 4 is a schematic representation of the electrical circuits employed in controlling the various functions of the coin operated vending machine. The circuits include a microprocessor 135 connected to RAM 136 and linked to the EPROM 137 by the usual busses. The CPU is connected by input/output ports to the various functions of the machine which include the display multiplexer 139 which drives small l.e.d.'s for the various beverage and ingredient selection displays. The CPU is also linked to a number of self-diagnosis signals through the port 138 connected to the various position switches which indicate to the circuitry the status of the various selected machine functions. The port 138 will also provide signals indicating the various possible faults or malfunctions which occur in machine operations, whether they be mechanical or electrical as sensed by appropriate sensors throughout the machine. The port 141 is connected to the beverage selection buttons located on the typical array of the front panel of the machine for signalling the customer's selection of beverage and various flavorings, etc.

Prior to the beginning of any cycle of brewing and dispensing, analog temperature sensors for the coffee and ingredient brewing water are checked for the ready condition by means of the ports 142 and 143 along with the status information for the various mechanical functions received from the self-diagnosis port 138. The coin acceptor and bill acceptor signals from the ports 144 and 146 respectively are calculated and compared with the signals from selection buttons through the port 141, and if matched, the exit port 147 sends a signal to initiate the corresponding brewing and dispensing cycle contained in the programmed data processor. The CPU will be programmed to run separate cycles for the various beverage selections as for example the cycles 1 through 8 noted in FIG. 4.

Main power supply 148 serves to supply the necessary DC voltage levels for driving the various electronic circuits as well as the solenoid and motor drives for the various machine functions. These functions include for example the motor drives for the coffee grinder, cam screw, grounds disposal mechanism and the hydraulic valves for piston positioning and the various other valves and pumps for water flow.

Figure 5:
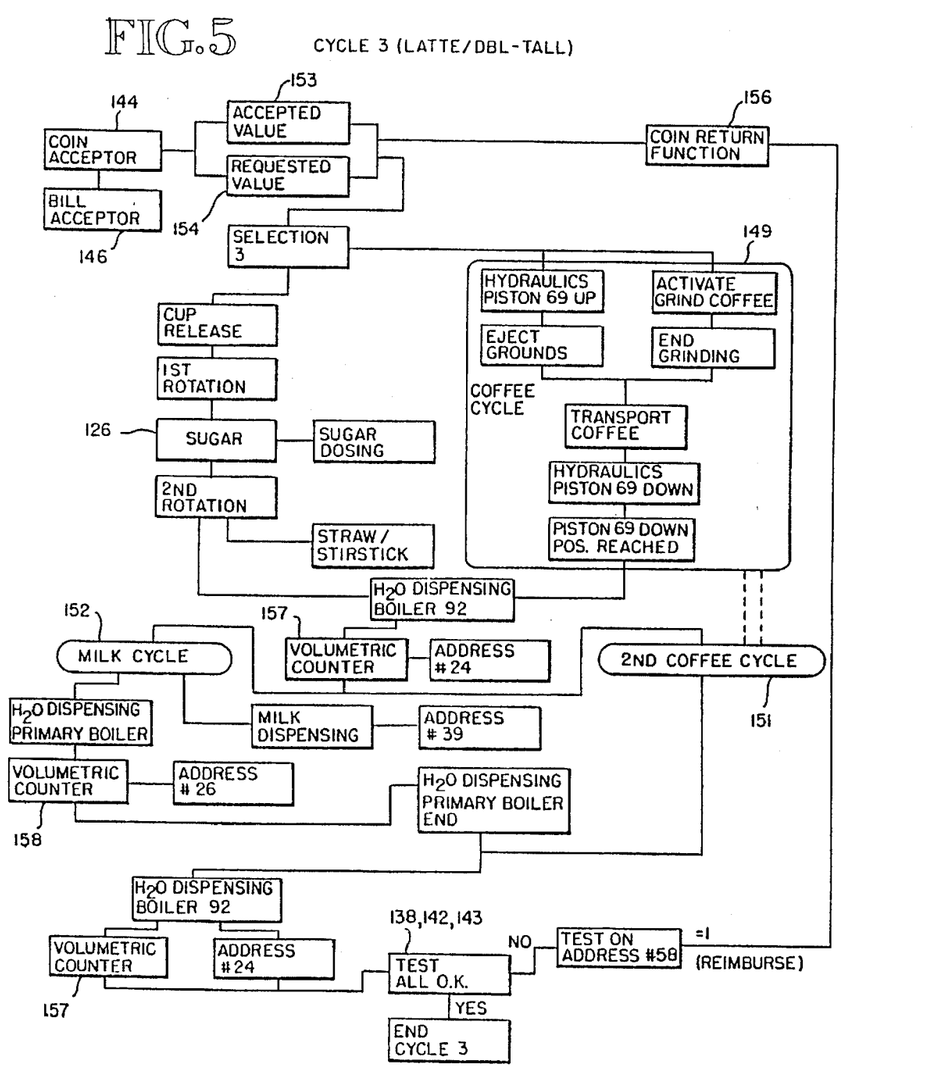
FIGS. 5–7 are schematic diagrams illustrating the timed sequence of process steps involved in the brewing cycle for double shot espresso beverages.
Figure 6:
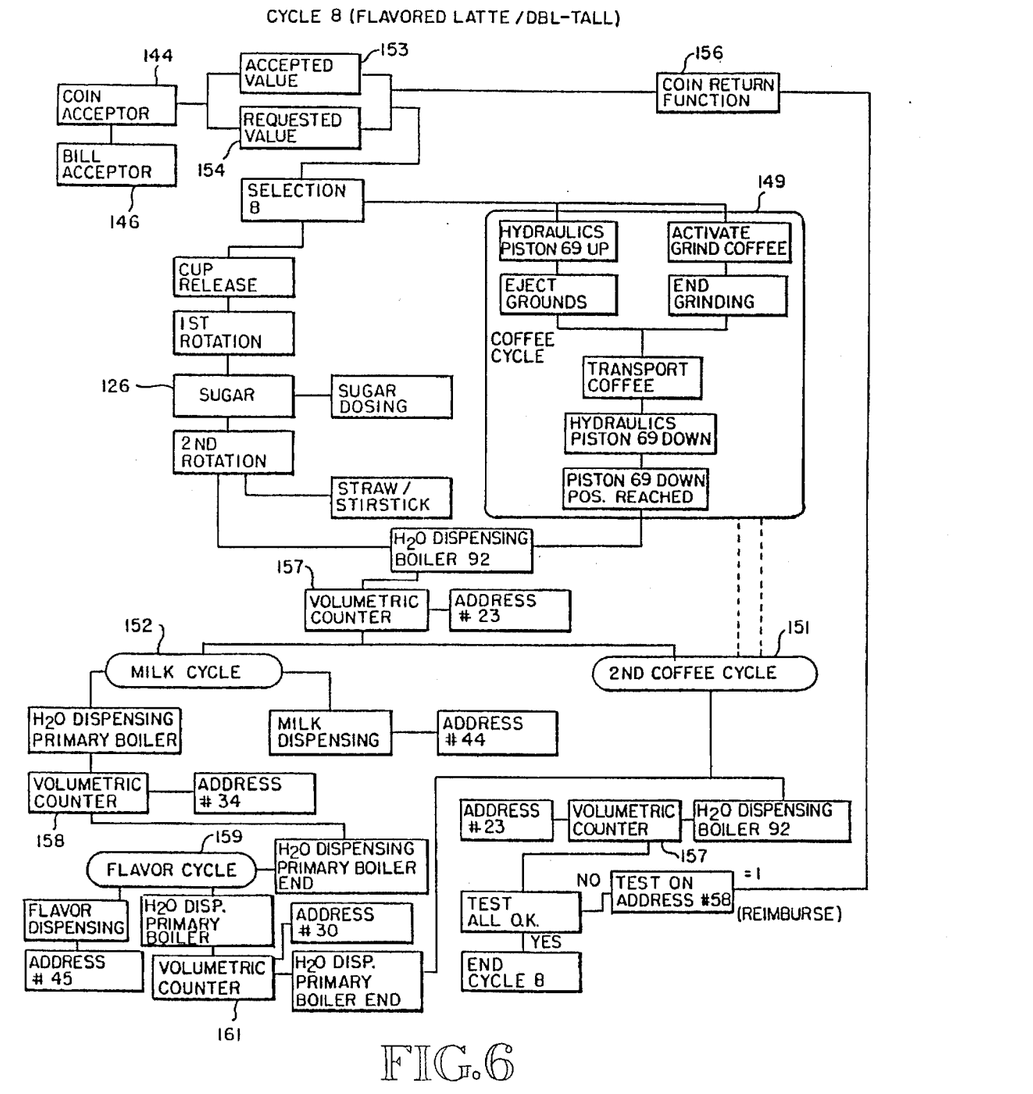

FIGS. 5 and 6 are schematic details of the timed sequence of process steps utilized in the brewing and dispensing of double shot espresso/crema beverages according to the present invention. FIG. 5 describes the sequence of steps in the brewing and dispensing of a double tall latte beverage and FIG. 6 illustrates the sequence of process steps in brewing a flavored double tall latte beverage. It will be understood that, while the illustrated examples pertain to specific beverages, the present brewing and dispensing process is applicable to the brewing of any double shot espresso beverage in an automatic dispensing machine.

Referring to FIG. 5, the data processing unit or CPU 135 will be preprogrammed to execute the sequence of steps in the proper timed sequence for any particular cycle in response to a customer's selection of a particular beverage via the appropriate beverage selection buttons and the port 141. As shown in FIG. 5, the espresso coffee brewing cycle 149 will be the same for all espresso beverages. The coffee cycle 149 constitutes the first espresso brewing cycle with the second espresso cycle 151 following in timed sequence as will presently be described. It will be understood that the second coffee cycle 151 comprises the same series of functions as the first coffee cycle 149. The second main ingredient of the latte beverage is milk provided by the milk cycle indicated at 152.

In describing the brewing and dispensing cycle in FIG. 5, it will be assumed that the initial analog temperature sensors and other ready conditions of the machine have been checked through the ports 138, 142 and 143 such that the machine is now ready to run a cycle according to the beverage selection made by the customer. As previously explained, the signals from either or both the coin acceptor 144 and bill acceptor 146 ports will be calculated and the accepted value 153 compared with the requested value 154 which constitutes a signal representing the actual beverage selection. If a match is made, the chosen cycle will be enabled through the port 147 which, in this case will initiate the cycle number 3 selection, namely a double tall latte. The normal coin return function 156 serves to return the proper change to the customer or to reimburse the customer in the event the selection is cancelled.

Once a selection, such as selection 3 or double tall latte in this instance, has been successfully signaled, the first espresso coffee cycle 149 is immediately initiated. Simultaneously with the initiation of the coffee cycle 149 the machine controls are signaled to prepare and position the beverage container to receive the first shot of espresso coffee. This series of operations begins with the cup dispensing unit which drops a cup into the aligned opening in the carousel. A first rotational stepping of the carousel delivers the container to the sugar dosing station beneath the sugar chute 126 where a premeasured amount of sugar is dispensed into the container. The second rotational stepping of the carousel follows in timed sequence and locates the beverage container in the beverage serving station 17, ready to receive the first shot of espresso. The coffee is delivered through the tube 107 and the other beverage ingredients are delivered through one of the appropriate conduits 116. Simultaneously with these series of steps the first coffee cycle 149 is in process.

As shown in FIG. 5, the sequence of steps in the first coffee brewing cycle includes the operation of the hydraulics to raise the piston 69 by means of the cylinder 72 to the extreme raised or up position. Movement of the piston 69 to the up position also raises the lower piston 84 to eject the spent grounds from the brewing cylinder 63 previously described and shown in FIG. 1. The grounds are removed from the top of the brewing block 59 by means of the sweep arm 88. Simultaneous with the raising of the piston, the coffee grinder is activated by the control system to grind the coffee which is delivered to a dosing container. Once the grinding has been completed, the piston 69 starts downward travel to reposition the lower piston 84 in the brewing chamber ready for a shot of espresso. The shot or dose of ground espresso coffee is then released into the brewing chamber 63. As the piston 69 continues, the down position is reached which serves to compact the charge or shot of ground coffee. With the piston in the down position, preheated and pressurized water is directed from the secondary boiler 92 in the brewing block through the compact ground coffee and into the beverage container. The quantity of water dispensed is determined by volumetric counter 157 which also signals the simultaneous actuation of the milk cycle 152 and the second coffee cycle 151 prior to the end of the first coffee dispensing. The first coffee dispensing flow is finally terminated when the predetermined volume is reached.

The milk dispensing cycle includes the metering of a predetermined amount of milk simultaneously with the introduction of a predetermined volume of pressurized hot water from the primary boiler. The hot water and milk are expelled through one of the conduits 116 and into the beverage container which now has been supplied with the first shot of espresso coffee. The quantity of milk released is preprogrammed and the amount of hot water from the primary boiler is controlled by a second volumetric counter 158. It will be understood that the actual dispensing of the milk commences prior to the end of the dispensing flow of the first coffee cycle from the espresso brewing unit 59.

While the milk cycle just described is being carried out, the second coffee cycle 151 is in progress. The second coffee cycle 151 contains the identical functions as the first coffee cycle 149 and will be commenced prior to the completion of the dispensing flow from the milk cycle 152 without interruption. The amount of water released from the boiler 92 will be volumetrically controlled by the counter 157 in the same manner as described relative to the first coffee cycle.

As soon as the second dispensing of espresso coffee has been completed a visual and audible signal will be sent to the display panel indicating to the customer that the beverage is now ready to be removed. The series of temperature and machine status checks are again made through the ports 138, 142 and 143 and the machine is then ready for the next successive beverage selection and cycling.

FIG. 6 is a schematic detail of the cycle for brewing a flavored double tall latte designated as cycle 8 in FIG. 4. While the present description is specific to a flavored double latte, it will be understood that the cycle also pertains to the brewing of any flavored coffee beverage- Referring to FIG. 6, it will be seen that the cup release and carousel rotation cycles, the first coffee cycle, second coffee cycle and milk cycle are identical to that described relative to FIG. 5. The flavor cycle 159, however, directly follows the milk cycle 152 prior to the end of the dispensing flow from the primary boiler of the milk cycle and prior to the dispensing of the second coffee cycle from the boiler 92. The flavor cycle includes the metered dispensing of flavoring from one of the supply containers in the bank 18 and a predetermined amount of hot water from the primary boiler with the volumetric counter 161 determining the amount of hot water added and mixed with the flavoring.

The completion of the first coffee cycle will have been accomplished prior to the completion of the flavor cycle 159 and the dispensing flow of the second coffee cycle is initiated prior to the completion of the flow from the flavor cycle without interruption. As soon as the second dispensing of espresso coffee has been completed a visual and audible signal will be sent to the display panel indicating to the customer that the beverage is now ready to be removed. Once the second coffee cycle is completed, the series of temperature and machine status checks are again made through the ports 138, 142 and 143 and the machine is then ready for the next successive beverage selection and cycling.

Figure 7:
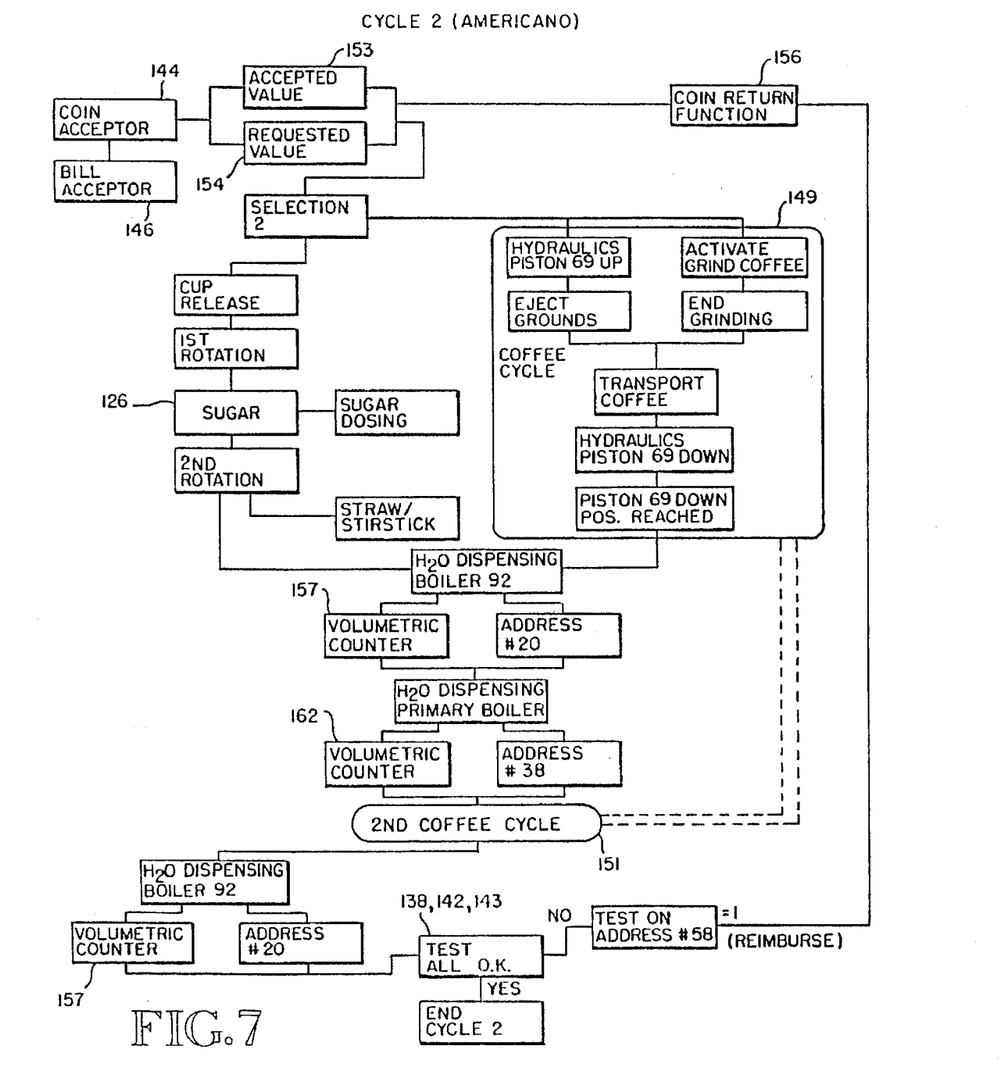

FIG. 7 is a schematic detail of the cycle for brewing an Americano coffee beverage, designated as cycle 2 in FIG. 4. The brewing includes a hot water cycle direct from the primary boiler with hot water being dispensed intermediate the first and second shots of espresso coffee. The Americano is a double tall straight coffee beverage according to the present invention which has superior taste characteristics as compared with conventional coffee beverages available in vending machines. The conventional method for brewing coffee, especially in vending machine apparatus, is to pass all of the hot water through the coffee grounds within a brewing chamber or its equivalent. This is true regardless of the size of the beverage to be dispensed. The result of this procedure is to carry most of the unwanted oils and acids from the ground coffee into the finished beverage. The larger the volume of beverage being brewed the greater the acidity and the more bitter the taste becomes. Additionally, since the extremely hot brewing water itself is used to obtain the necessary volume, the finished beverage is too hot to drink. For this reason much of the coffee dispensed from vending machines is substandard compared to properly brewed coffee and cannot be consumed immediately after dispensing. With the present method, it is possible to produce a double tall Americano coffee with superior taste qualities, low acidity and at a temperature suitable for drinking immediately. This result is obtained by using a double shot espresso brew and dispensing a quantity of water at a lower temperature into the container without passing it through the ground coffee.

Referring to FIG. 7, it will be seen that the cup release, carousel rotation cycle and the first coffee cycle are identical to those described relative to FIGS. 5 and 6. Once the proper quantity of water has been dispensed as determined by the volumetric counter 157, actuation of the straight hot water cycle is initiated. The water cycle comprises flow of hot water directly from the primary boiler of the machine rather than from the boiler 92 such that the hot water does not contact the ground coffee.

The hot water dispensing cycle from the primary boiler includes a metering of a predetermined amount of hot water according to the volumetric counter 162. This hot water is delivered to the container via an independent delivery tube 116 which comprises an additional delivery tube exclusively for the Americano coffee. While the water cycle just described is being carried out, the second coffee cycle 151 is in progress with the second coffee cycle being identical to that described relative to FIGS. 5 and 6. The second coffee cycle begins simultaneously with the ending of the water cycle with uninterrupted flow as previously described. As soon as the second dispensing of espresso coffee has been completed, a visual and audible signal will be sent to the display panel indicating to the customer that the beverage is now ready to be removed. In the manner previously described, once the second coffee cycle is completed, the series of temperature and machine status checks are again made through the ports 138, 142 and 143 and the machine is then ready for the next successive beverage selection and cycling.

The present invention has been described with reference to a preferred embodiment. Modifications and alterations may become apparent to one skilled in the art upon reading and understanding this specification. It is intended to include all such modifications and alterations within the scope of the appended claims.

What is claimed is:

1. Apparatus for brewing and dispensing beverages containing two single portions of a brewed beverage and a separate liquid ingredient comprising, in combination;
   brewing means for brewing and creating a dispensing flow of first and second successive portions of said brewed beverage with a time lag between the end of the dispensing flow of the first portion and the commencement of dispensing flow of the second portion, and
   dispensing means for dispensing the separate liquid ingredient during the duration of said time lag.

2. Apparatus for brewing and dispensing beverages containing two single portions of a brewed beverage and a separate ingredient comprising, in combination;
   brewing means for brewing and creating a dispensing flow of a single portion of said brewed beverage,
   said brewing means having first and second brewing cycles of a predetermined time duration for successively brewing and dispensing first and second portions of said brewed beverage,
   said second brewing cycle creating a predetermined time lag between the end of the dispensing flow from the first brewing cycle and the beginning of dispensing flow from said second brewing cycle,
   a dispensing device for said separate ingredient, and
   control means for initiating dispensing flow from said dispensing device prior to the termination of dispensing flow from the first brewing cycle,
   the dispensing flow from said dispensing device being of such duration as to span said time lag between said first and second brewing cycles,
   whereby a double portion brewed beverage is dispensed without interruption of dispensing flow.

3. Apparatus for brewing and dispensing hot beverages containing two single shot espresso coffee portions and a separate liquid ingredient comprising, in combination;
   espresso coffee brewing means for brewing and creating a dispensing flow of a single shot espresso coffee, said brewing means having first and second brewing cycles of a predetermined time duration for successively brewing and dispensing first and second shots of espresso coffee, said second brewing cycle creating a predetermined time lag between the end of the dispensing flow from the first brewing cycle and the beginning of dispensing flow from said second brewing cycle, a dispensing device for said separate liquid ingredient, and control means for initiating dispensing flow from said dispensing device prior to the termination of the dispensing flow from the first brewing cycle, the dispensing flow from said dispensing device being of such duration as to span said time lag between said first and second brewing cycles, whereby a double shot espresso coffee beverage is dispensed without interruption of dispensing flow.

4. The apparatus of claim 3 wherein said first and second shots of espresso coffee are dispensed into a beverage container and said dispensing device includes apparatus for dispensing a latte foam and means to direct said latte foam into said beverage container to form a double tall latte beverage.

5. The apparatus of claim 4 wherein the dispensing of said latte foam comprises a a first milk cycle, said dispensing device having a second flavor cycle for mixing a predetermined portion of flavoring with a predetermined volume of hot water to form a foamed flavor additive, the combined dispensing flow from said milk cycle and said flavor cycle being of such duration as to span said time tag between said first and second brewing cycles.

6. The apparatus of claim 3 wherein said first and second shots of espresso coffee are dispensed into a beverage container and said dispensing device includes;

a source of water under pressure, primary boiler means to maintain said water at a predetermined temperature, and conduit means to direct said water directly into said beverage container.

7. The apparatus of claim 6 wherein said espresso coffee brewing means includes;

first boiler for maintaining brewing water at a first predetermined elevated temperature suitable for espresso coffee brewing, said primary boiler means maintaining said hot water at a second predetermined temperature below the elevated temperature of said brewing water.

8. A method of brewing and dispensing beverages containing two single portions of a brewed beverage and a separate liquid ingredient comprising the steps of;

brewing and dispensing first and second portions of said beverage in succession with a predetermined time lag between the end of dispensing flow of the first portion and the commencement of dispensing flow of said second portion, and introducing a dispensing flow of a separate liquid ingredient prior to the end of dispensing flow of said first portion, and maintaining dispensing flow of said separate ingredient throughout said predetermined time lag.

9. A method of brewing and dispensing beverages containing two single portions of a brewed beverage and a separate liquid ingredient comprising the steps of;

brewing a first single portion of said beverage having a predetermined dispensing flow period, creating a dispensing flow of said separate ingredient of a predetermined flow period prior to the end of the first flow period, initiating the brewing of a second single portion of said beverage upon completion of said first brewing, and initiating dispensing flow of said second portion prior to the end of the flow of said separate ingredient.

10. The method according to claim 9 wherein said steps are carried out in a coin operated vending machine.

11. The method of claim 9 wherein said first and second single portions comprise espresso coffee and said separate ingredient comprises a foamed mixture of hot water and powdered milk, whereby a double tall latte is formed without interruption of dispensing flow.

12. The method according to claim 11 wherein said steps are carried out in a coin operated vending machine.

13. A device for dispensing beverages containing two single portions of a brewed beverage and a separate ingredient comprising, in combination;

apparatus providing a supply of said brewed beverage and creating a dispensing flow of successive first and second portions of said beverage with a time lag between the end of the dispensing flow of the first portion and the commencement of dispensing flow of the second portion, and an ingredient dispenser for dispensing the separate ingredient during the duration of said time lag.

14. The device of claim 13 including;

a control circuit for actuating said ingredient dispenser to initiate dispensing of said ingredient prior to the termination of the dispensing flow of said first portion of brewed beverage.

15. The device of claim 14 wherein;

the duration of said time lag provides for commencement of dispensing flow of the second portion prior to the end of the flow of said separate ingredient.

16. A method of brewing and dispensing beverages containing two single portions of a brewed beverage and a separate ingredient comprising the steps of;

brewing and dispensing first and second portions of said beverage in succession with a predetermined time lag between the end of dispensing flow of the first portion and the commencement of dispensing flow of said second portion, and introducing a dispensing flow of a separate ingredient prior to the end of dispensing flow of said first portion, and maintaining dispensing flow of said separate ingredient throughout said predetermined time lag.

17. Apparatus for brewing and dispensing beverages containing two single portions of a brewed beverage and a separate ingredient comprising, in combination;

brewing means for brewing and creating a dispensing flow of first and second successive portions of said brewed beverage with a time lag between the end of the dispensing flow of the first portion and the commencement of dispensing flow of the second portion; and dispensing means for dispensing the separate ingredient during the duration of said time lag.

* * * * *

UNITED STATES PATENT AND TRADEMARK OFFICE
CERTIFICATE OF CORRECTION

PATENT NO. : 5,650,186
DATED : July 22, 1997
INVENTOR(S) : Faust Annoni; Stefano Sandei; Ugo Sandei; Pietro Sandei It is certified that error appears in the above-identified patent and that said Letters Patent is hereby corrected as shown below:

Col 3, line 5, change "lake" to --like--
Col 7, line 12 cancel the "-" after "beverage" and insert
    a period --(.)-- therefor.

Signed and Sealed this

Second Day of December, 1997

BRUCE LEHMAN

Attest:

*Attesting Officer*  *Commissioner of Patents and Trademarks*